(12) United States Patent
Fujii (10) Patent No.: US 11,100,198 B2
(45) Date of Patent: Aug. 24, 2021

(54) AUTHENTICATION DEVICE, TERMINAL DEVICE, IMAGE FORMING SYSTEM, AND NON-TRANSITORY COMPUTER READABLE MEDIUM

(71) Applicant: FUJIFILM Business Innovation Corp., Tokyo (JP)

(72) Inventor: Masaru Fujii, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 68 days.

(21) Appl. No.: 15/655,900

(22) Filed: Jul. 21, 2017

(65) Prior Publication Data

US 2018/0101667 A1 Apr. 12, 2018

(30) Foreign Application Priority Data

Oct. 11, 2016 (JP) .............................. JP2016-200382

(51) Int. Cl.
| G06F 21/00 | (2013.01) |
| G06F 7/04 | (2006.01) |
| H04N 7/16 | (2011.01) |
| G06F 21/12 | (2013.01) |
| G06F 21/34 | (2013.01) |

(Continued)

(52) U.S. Cl.
CPC ............ G06F 21/121 (2013.01); G06F 3/123 (2013.01); G06F 3/1203 (2013.01); G06F 3/1222 (2013.01); G06F 3/1238 (2013.01); G06F 3/1284 (2013.01); G06F 3/1285 (2013.01); G06F 21/12 (2013.01); G06F 21/34 (2013.01); H04N 1/4413 (2013.01); H04N 1/4433 (2013.01); G06F 2221/0773 (2013.01); H04N 2201/0094 (2013.01)

(58) Field of Classification Search
CPC ........ G06F 21/121; G06F 21/12; G06F 21/34; G06F 3/1203; G06F 3/123; G06F 3/1285; G06F 3/1222; G06F 3/1284; G06F 3/1238; G06F 2221/0773; H04N 1/4433; H04N 1/4413; H04N 2201/0094
USPC .......................................................... 726/28
See application file for complete search history.

(56) References Cited

U.S. PATENT DOCUMENTS

| 8,300,819 B2 | 10/2012 | Sakaguchi et al. |
| 10,044,695 B1 * | 8/2018 | Cahill ..................... H04L 63/08 |

(Continued)

FOREIGN PATENT DOCUMENTS

| JP | 3785640 | 6/2006 |
| JP | 4868801 | 2/2012 |

(Continued)

OTHER PUBLICATIONS

Office Action of Japan Counterpart Application, with English translation thereof, dated Aug. 4, 2020, pp. 1-5.

Primary Examiner — Kendall Dolly
Assistant Examiner — Kevin Ayala
(74) Attorney, Agent, or Firm — JCIPRNET (57) ABSTRACT

An authentication device includes an input unit that inputs specific information of an application to be installed and specific information of an image forming device which is an installation destination, and a controller that collates the specific information of the application and the specific information of the image forming device with a database to output an authentication result indicating that authentication has been performed or has not been performed.

8 Claims, 9 Drawing Sheets

(51) Int. Cl.
*G06F 3/12* (2006.01)
*H04N 1/44* (2006.01)

(56) References Cited

U.S. PATENT DOCUMENTS

| | | | |
|---|---|---|---|
| 2009/0183229 A1 | 7/2009 | Ohnishi | |
| 2009/0310178 A1* | 12/2009 | Tomita | G06F 21/608 |
| | | | 358/1.15 |
| 2010/0211945 A1* | 8/2010 | Doui | G06F 21/105 |
| | | | 717/176 |
| 2011/0004945 A1* | 1/2011 | Kurokawa | G06F 21/121 |
| | | | 726/30 |
| 2011/0321172 A1* | 12/2011 | Maeda | G06F 21/10 |
| | | | 726/27 |
| 2013/0010329 A1* | 1/2013 | Yuki | G06F 21/10 |
| | | | 358/1.15 |
| 2013/0057896 A1* | 3/2013 | Ito | G06K 15/4095 |
| | | | 358/1.14 |
| 2013/0286416 A1* | 10/2013 | Saurabh | G06F 3/123 |
| | | | 358/1.13 |
| 2016/0072969 A1* | 3/2016 | Nakahara | H04N 1/00344 |
| | | | 358/1.15 |
| 2017/0068823 A1* | 3/2017 | Stepanov | G06F 21/608 |
| 2018/0063373 A1* | 3/2018 | Hardy | G06F 3/1203 |

FOREIGN PATENT DOCUMENTS

| | | | | |
|---|---|---|---|---|
| JP | 2013239098 | * 11/2013 | | G06F 9/445 |
| JP | 5401490 | 1/2014 | | |
| JP | 5531819 | 6/2014 | | |
| JP | 2015191539 | * 11/2015 | | G06F 21/10 |

\* cited by examiner

APPLICATION INSTALLER          114
PLEASE INPUT  ┌──────────────────────┐  ┌─────┐
LICENSE ID    │ 1111-2222-3333-6670  │  │ SET │
              └──────────────────────┘  └─────┘
┌─────────────────────────────────────────────┐
│ IP ADDRESS OF IMAGE                         │
│ FORMING DEVICE         LICENSE ID           │
│ 172. 27. 241. 190      1111-2222-3333-6670  │
│ 172. 27. 241. 191      1111-2222-3333-6670  │
└─────────────────────────────────────────────┘
     115              ┌─────────┐  ┌────────┐
                      │ INSTALL │  │ CANCEL │
                      └─────────┘  └────────┘

FIG. 10

APPLICATION INSTALLER
                                    116
┌──────────────────────────────────────────────┐
│ INSTALLATION DESTINATION: 172. 27. 241. 190  │
│ INSTALLATION DESTINATION: 172. 27. 241. 191  │
└──────────────────────────────────────────────┘
INSTALLATION HAS BEEN COMPLETED

┌──────────┐  ┌────────┐
              │ NEXT  >  │  │ CANCEL │
              └──────────┘  └────────┘

FIG. 11

AUTHENTICATION DEVICE, TERMINAL DEVICE, IMAGE FORMING SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-200382 filed on Oct. 11, 2016.

BACKGROUND

(i) Technical Field

The present invention relates to an authentication device, a terminal device, an image forming system, and a non-transitory computer readable medium storing a program.

(ii) Related Art

Hitherto, various license authentication techniques have been proposed.

SUMMARY

There have been known add-on type applications which are added later and operated on an image forming device such as a multi-function printer. The applications can be installed and set up on a target image forming device by a user through an installer or the like. Regarding an onerous application among such applications, a user needs to legally acquire the right to use the onerous application on the basis of a contract. The proving of being a regular user needs to be performed once or more at a stage before the use of the application. Even when an application or an installer is illegally acquired, a certain validity verification function is executed, and thus a process of inhibiting the set-up processing or the start-up of the application may be performed. A representative validity verification method is a software license authentication method.

According to an aspect of the invention, there is provided an authentication device including an input unit that inputs specific information of an application to be installed and specific information of an image forming device which is an installation destination, and a controller that collates the specific information of the application and the specific information of the image forming device with a database to output an authentication result indicating that authentication has been performed or has not been performed.

BRIEF DESCRIPTION OF THE DRAWINGS

Exemplary embodiment (s) of the present invention will be described in detail based on the following figures, wherein.

DETAILED DESCRIPTION

Hereinafter, an exemplary embodiment of the present invention will be described with reference to the accompanying drawings.

Figure 1:
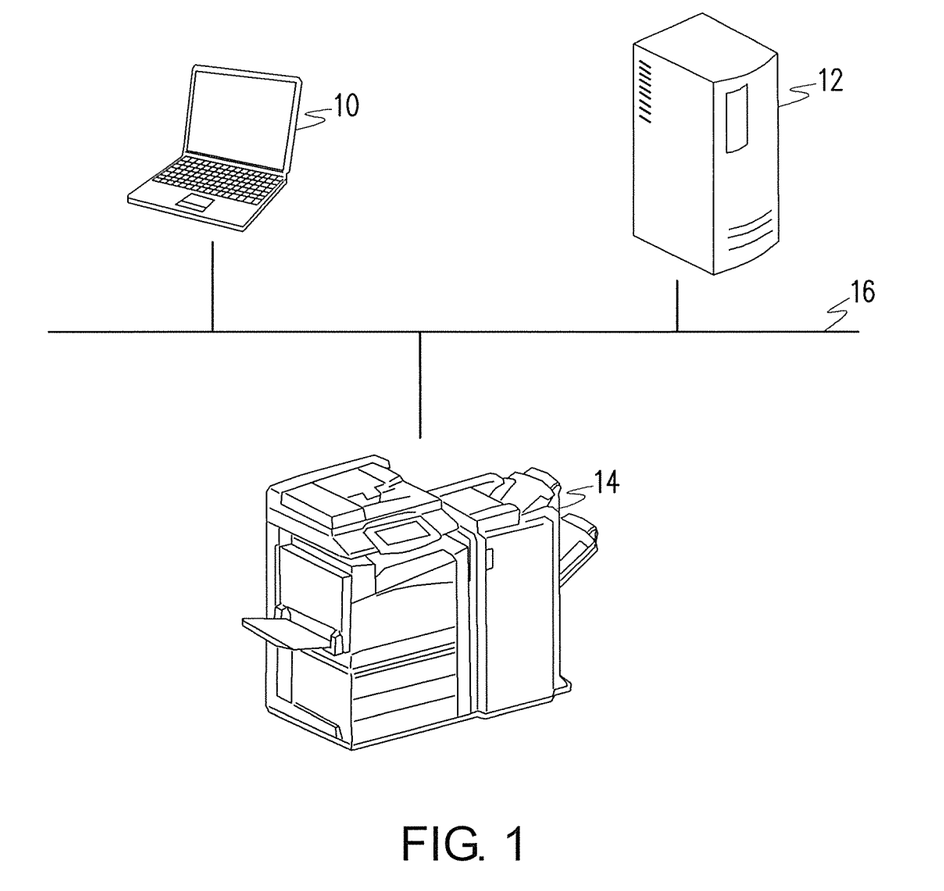
FIG. 1 is a system configuration diagram of an exemplary embodiment.

FIG. 1 is a system configuration diagram illustrating an image forming system in this exemplary embodiment. The system includes a terminal device 10 such as a PC or a tablet terminal, an authentication device 12, and an image forming device 14 such as a multi-function printer. The terminal device 10, the authentication device 12, and the image forming device 14 are connected to a network 16 so as to be capable of transmitting and receiving data.

The terminal device 10 stores an installer (set-up program) for installing an application to be added to the image forming device 14 on the image forming device 14 and a processing program for performing a process required for the application to be installed on the image forming device 14. Hereinafter, the processing program and the installer will be collectively referred to as an installer. The terminal device 10 acquires information for uniquely specifying an application to be installed on the image forming device 14 and information for uniquely specifying the image forming device 14 which is an installation destination of the application, and transmits these pieces of information to the authentication device 12 through the network 16.

The authentication device 12 stores an authentication processing program for performing an authentication process at the time of installing an application on the image forming device 14. The authentication device 12 determines whether or not authentication has been completed, on the basis of the information transmitted from the terminal device 10, that is, information for specifying an application to be installed and information for specifying the image forming device 14 which is an installation destination, and transmits the result thereof to the terminal device 10.

The image forming device 14 is a multi-function printer that performs plural functions such as scanning, FAX, printing, and copying, and is the image forming device 14 on which any application may be installed later. The terminal device 10 installs an application to be installed on the image forming device 14 which is an installation destination and sets up the application in a case where an authentication result indicating whether the authentication has been performed is obtained from the authentication device 12.

A process in the terminal device 10 is realized by the execution of the installer, and a process in the authentication device 12 is realized by the execution of the authentication processing program.

Processes of the terminal device 10 are as follows:
Start-up of the installer
Specification of an application to be installed and the image forming device which is an installation destination Acquisition of information (specific information) for uniquely specifying the application to be installed and information (specific information) for uniquely specifying the image forming device which is an installation destination Transmission of the information (specific information) for uniquely specifying the application to be installed and the information (specific information) for uniquely specifying the image forming device which is an installation destination to the authentication device 12

Reception of an authentication result obtained by the authentication device 12

Installation of the application to be installed on the image forming device which is an installation destination in a case where the authentication result indicates that authentication has been performed Transmission of license authentication information to the authentication device 12 in a case where the authentication result indicates that authentication has not been performed In addition, processes of the authentication device 12 are as follows:

Input (reception) of information (specific information) for uniquely specifying the application to be installed and information (specific information) for uniquely specifying the image forming device which is an installation destination Determination of whether or not authentication has been completed by collating the information (specific information) for uniquely specifying the application to be installed and the information (specific information) for uniquely specifying the image forming device which is an installation destination with information registered in a database Transmission of an authentication result to the terminal device 10

Figure 2:
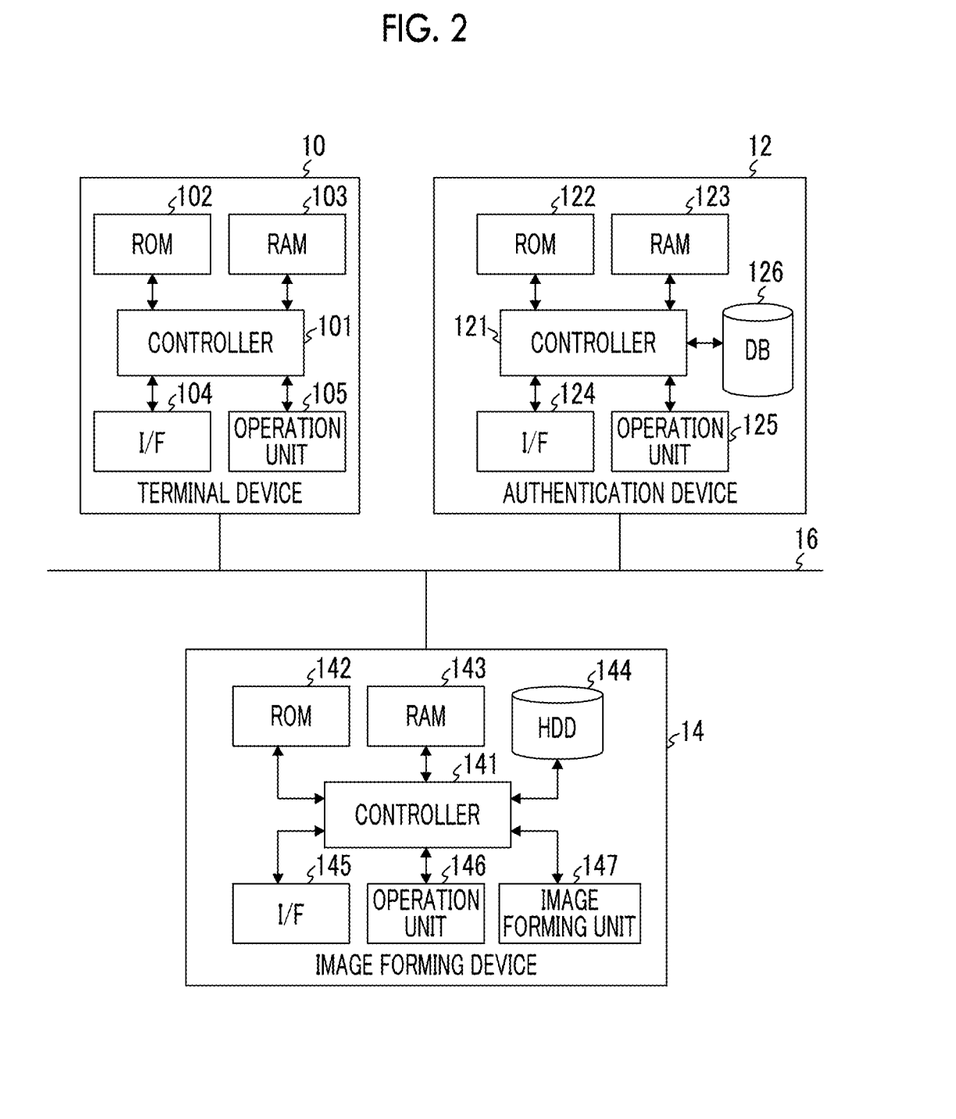
FIG. 2 is a configuration block diagram of the exemplary embodiment.

Input (reception) of license authentication information transmitted from the terminal device 10 in a case where the authentication result indicates that authentication has not been performed An authentication process using the license authentication information Registration of associated pieces of information of the information (specific information) for uniquely specifying the application to be installed, the information (specific information) for uniquely specifying the image forming device which is an installation destination, and the license authentication information in a database FIG. 2 is a configuration block diagram of the system in FIG. 1.

The terminal device 10 is a PC or a tablet terminal, and includes a controller 101 constituted by one or plural CPUs, a ROM 102, a RAM 103, a communication interface (I/F) 104, and an operation unit 105. In addition, the terminal device includes a display unit such as a display, but may include a touch panel functioning as both the operation unit 105 and the display unit. The ROM 102 (or a program memory such as an SSD or an HDD) stores an OS, necessary driver software, and an installer, and the controller 101 executes the installer to transmit information to the authentication device 12 through the communication interface 104 and the network 16, and installs a target application on the image forming device 14 on the basis of an authentication result from the authentication device 12. In a case where a reply from the authentication device 12 indicates that authentication has not been performed, a user operates the operation unit 105 of the terminal device 10, for example, a keyboard, a mouse, or a pen to input the license authentication information, and transmits the license authentication information to the authentication device 12. In a case where a reply from the authentication device 12 indicates that authentication has been performed, the user does not need to input the license authentication information, and the license authentication information, of course, is not transmitted to the authentication device 12 through the network 16.

The authentication device 12 functions as an authentication server on the network, and includes a controller 121 constituted by one or plural CPUs, a ROM 122, a RAM 123, a communication interface (I/F) 124, an operation unit 125, and a database (DB) 126. The ROM 122 (or a program memory such as an SSD or an HDD) stores an OS, necessary driver software, and an authentication program for executing an authentication process. The controller 121 executes the authentication program to determine whether or not authentication is necessary, by using information received from the terminal device 10, and transmits the result thereof to the terminal device 10 as a reply. Specifically, when the information for uniquely specifying an application to be installed and the information for uniquely specifying the image forming device 14 which is an installation destination, which are transmitted from the terminal device 10, are received through the network 16 and the communication interface 124, the controller 121 collates the pieces of information with the database 126 to determine whether or not the set of two pieces of information has already been registered in the database 126. When the set of two pieces of information has already been registered in the database 126, a reply indicating that authentication has been performed is transmitted to the terminal device 10. When the set of two pieces of information has not yet been registered in the database 126, a reply indicating that authentication has not been performed is transmitted to the terminal device 10 through the communication interface 124 and the network 16. In this case, since the license authentication information is transmitted from the terminal device 10, the controller 121 receives the license authentication information through the network 16 and the communication interface 124, confirms whether or not the license authentication information is regular information, and newly registers the information for specifying an application to be installed, the information for specifying the image forming device 14 which is an installation destination, and the license authentication information in the database 126 in association with each other when the authentication can be performed. In this exemplary embodiment, the communication interface 124 functions as an input unit that inputs the specific information of the application to be installed and the specific information of the image forming device which is an installation destination, and the controller 121 functions as a controller that collates the specific information of the application and the specific information of the image forming device with the database and outputs an authentication result indicating whether or not authentication has been completed.

The image forming device 14 includes a controller 141 constituted by one or plural CPUs, a ROM 142, a RAM 143, an HDD 144, an input and output interface (I/F) 145, an operation unit 146 such as a touch panel, and an image forming unit 147.

The controller 141 receives a printing job command and the like from an external terminal device through the input and output interface 145 in accordance with the processing program stored in the ROM 142 (or the HDD 144), analyzes PDL data to generate intermediate data, and further generates drawing data (raster data) from the generated intermediate data. In addition, the controller 141 executes various commands, such as copy, scan, and fax, which are received from the operation unit 146. Further, the controller 141 receives an application supplied by the installer of the terminal device 10, and stores and adds the received application in the HDD 144.

The image forming unit 147 includes a print module, a scanner module, a facsimile module, a sheet feeding module, a copy feeding module, and an image processing accelerator.

The print module is a module having a function of outputting an image to a sheet. For example, the print module has a known inkjet type configuration, and prints drawing data on a sheet. The print module ejects liquid or fusible solid ink from a nozzle or the like to perform recording on paper, a film, or the like. Examples of a method of ejecting ink include a drop-on-demand method (pressure pulse method) of ejecting ink by using electrostatic attraction, a thermal inkjet method of ejecting ink by using the pressure generated by the formation and development of air bubbles by intense heat, and the like. A recording head includes a head that ejects cyan ink, a head that ejects magenta ink, a head that ejects yellow ink, and a head that ejects black ink, and a line head having at least the same width as the width of a sheet is used for the heads. Ink droplets of the respective colors are ejected onto an intermediate transfer body and are recorded by the recording head, and are then transferred to the sheet, thereby printing the sheet.

The scanner module is a module that reads an image from the sheet and converts the image into electronic data.

The facsimile module is a module that includes a modem and an image processing module for facsimile and executes a facsimile function.

The sheet feeding module is a module that transports the sheet to the print module from a sheet tray.

The copy feeding module is a module that transports the sheet to the scanner module from a copy tray.

The image processing accelerator is a module that performs compression and extension in association with the scanner module and the like. The image processing accelerator is not an essential module, and may be configured as an additional module.

In addition, the image forming device 14 may include a finisher that performs patching, sorting, and the like of a sheet, a USB, an authentication unit which is constituted by an IC card reader and the like and performs user authentication, a charging unit, a human sensor, a facial camera, and the like. In addition, the image forming device 14 may include Ethernet (registered trademark) or WiFi (registered trademark).

The network 16 is the Internet, a local area network (LAN), or the like, but may be a wired or wireless network without being limited thereto. In addition, the network may be a public line or a dedicated line. The terminal device 10 and the authentication device 12 may be connected to each other through a protocol such as HTTPS.

Hereinafter, a process of adding an application executed by the terminal device 10, the authentication device 12, and the image forming device 14 will be described in detail.

Figure 3:
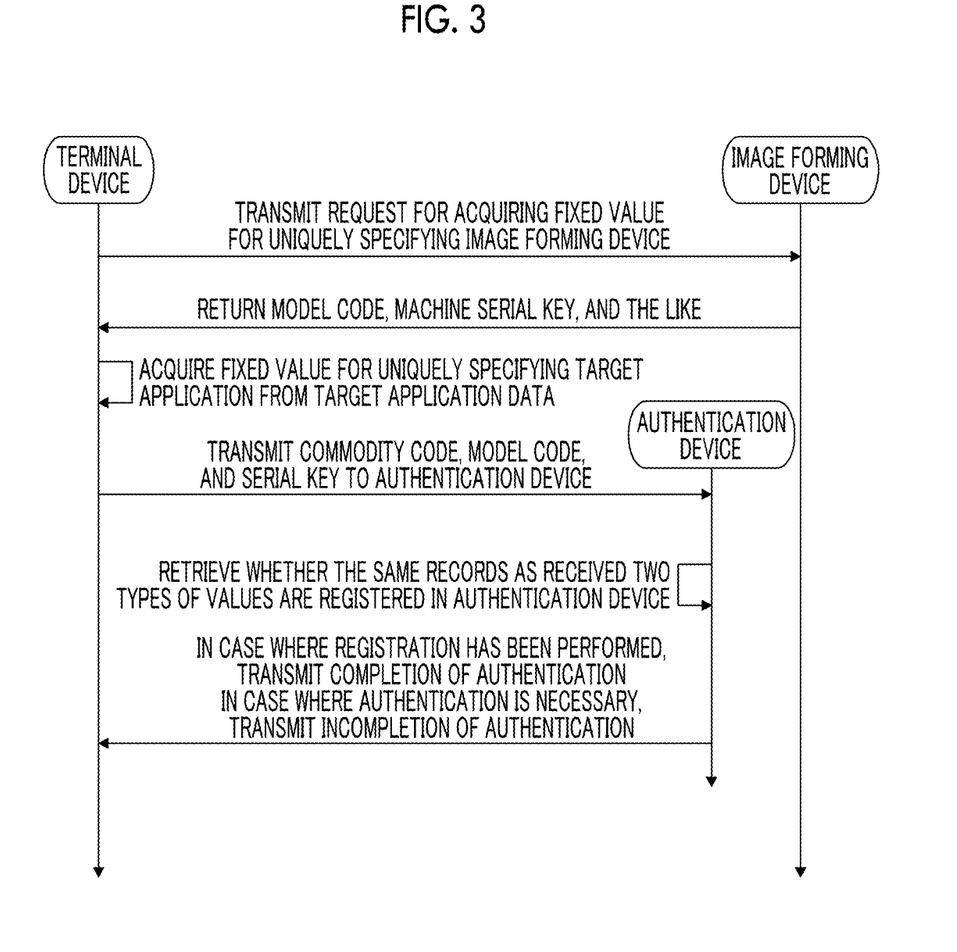
FIG. 3 is a sequence diagram (Part 1) of the exemplary embodiment.

FIG. 3 is a sequence diagram of the terminal device 10, the authentication device 12, and the image forming device 14. First, in the terminal device 10, when a user starts up the installer, the controller 101 displays a screen for prompting the input of an application to be installed and the image forming device 14 which is an installation destination of the application on the display unit. The user inputs the application to be installed and the image forming device 14 which is an installation destination of the application on the screen. The controller 101 transmits a request for acquiring fixed information for uniquely specifying the image forming device 14 to the image forming device 14, which is input by the user, through the communication interface 104 and the network 16. The image forming device 14 receiving the user's input is the name, the IP address, or the like of the image forming device 14, and the fixed information for uniquely specifying the image forming device 14 is invariable information which is inherent in the image forming device 14, and specifically, is a model code, a machine serial key, and the like of the image forming device 14. The model code and the machine serial key are assigned to the image forming device 14 at the time of the factory shipment and are stored in the ROM or the like.

When the controller 141 of the image forming device 14 receives the request for acquisition from the controller 101, the controller reads the specific information, such as the model code and the machine serial key, which is stored in the ROM 142, and transmits the specific information to the controller 101 of the terminal device 10 through the network 16 as a reply.

When the controller 101 receives the specific information from the controller 141 of the image forming device 14, the controller then acquires the specific information for uniquely specifying an application to be installed from a specific file of a target application, for example, a registry file. The specific information for uniquely specifying an application to be installed is invariable information inherent in the application, and specifically, is a commodity code (product key) or the like of the application.

When the controller 101 acquires the commodity code (product key) as the specific information of the application to be installed (hereinafter, referred to as "application specific information") and the model code and the machine serial key as the specific information of the image forming device 14 which is an installation destination (hereinafter, referred to as "image forming device specific information"), the controller transmits these pieces of information to the authentication device 12 through the network 16. Meanwhile, these two types of information are not secret information in spite of being information inherent in the application or the image forming device 14, and do not have confidentiality like license authentication information.

When the controller 121 of the authentication device 12 receives two types of information from the controller 101, the controller determines whether or not the two types of information have already been registered in the database 126 with reference to the database 126. In a case where the two types of information have already been registered, the controller 121 transmits a reply indicating that authentication has been performed to the controller 101. On the other hand, in a case where the two types of information have not yet been registered in the database 126, the controller 121 transmits a reply indicating that authentication has not been performed to the controller 101.

Figure 4:
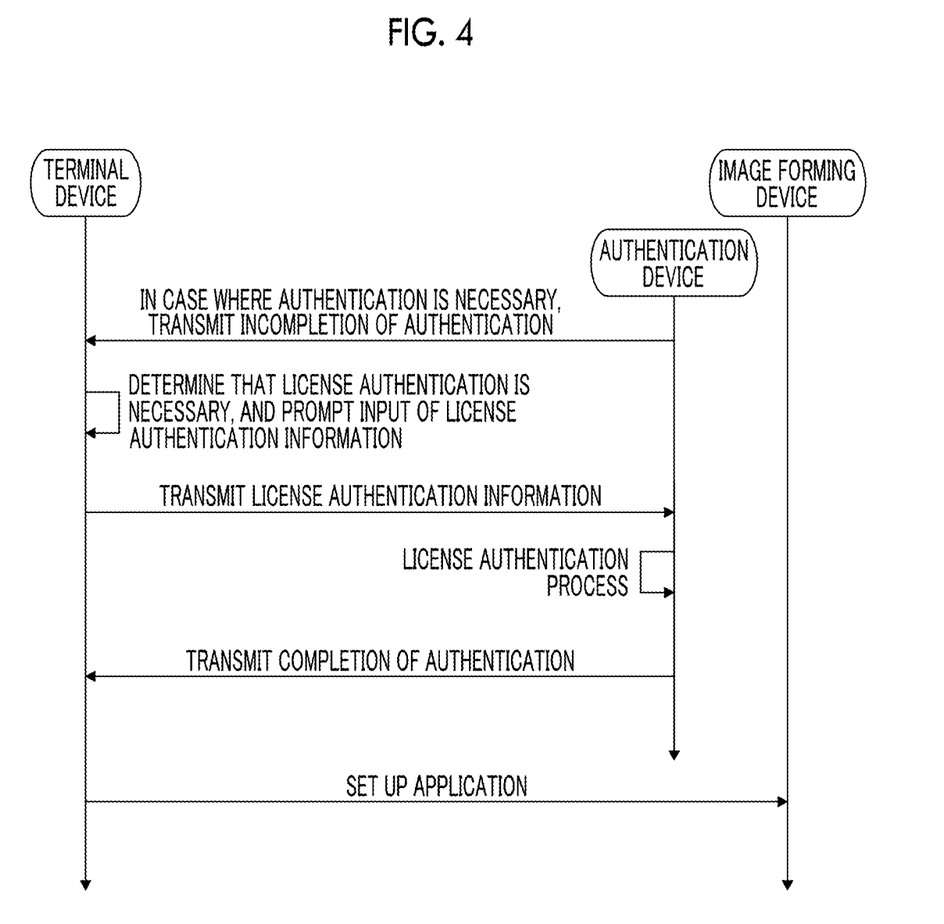
FIG. 4 is a sequence diagram (Part 2) of the exemplary embodiment.

FIG. 4 is a sequence diagram in a case where the controller 121 of the authentication device 12 determines that authentication has not been performed.

The controller 121 of the authentication device 12 determines that authentication is necessary and transmits a reply indicating that authentication has not been performed to the controller 101 of the terminal device 10 in a case where two types of information of the application specific information and the image forming device specific information are not registered in the database 126 as described above.

When the controller 101 receives a reply indicating authentication has not been performed, the controller determines that license authentication is necessary and displays a screen for prompting the input of license authentication information on the display unit. A user inputs license authentication information of an application to be installed, for example, a license key in accordance with the screen. The controller 101 transmits the input license authentication information to the authentication device 12.

When the controller 121 of the authentication device 12 receives the license authentication information, the controller performs an authentication process in accordance with an authentication processing program. Specifically, the received license authentication information is collated with predetermined information, and it is determined whether or not both the pieces of information conform to each other. In a case of conformity, the controller 121 associates the application specific information, the image forming device specific information, and the input license authentication information with each other, registers the associated information in the database 126 as a set, and transmits a reply indicating that authentication has been performed to the controller 101.

When the controller 101 receives the reply indicating that authentication has been performed, the controller transmits an application to be installed to the image forming device 14 which is an installation destination in accordance with the installer, and sets up the application. The controller 141 of the image forming device 14 receives a target application from the terminal device 10, stores the received target application in the HDD 144, and adds the application. When the controller 101 receives a reply indicating that authentication has been performed, the controller deletes the license authentication information which is input by the user from the memory.

Figure 5:
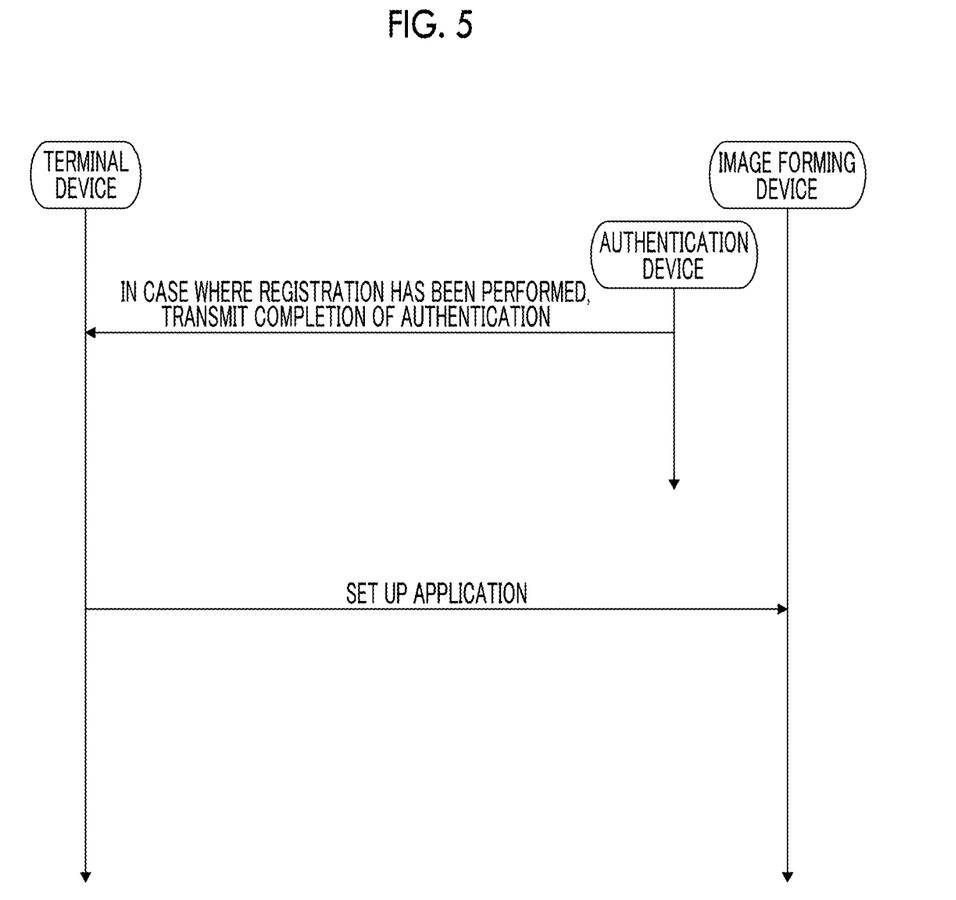
FIG. 5 is a sequence diagram (Part 3) of the exemplary embodiment.

On the other hand, FIG. 5 is a sequence diagram in a case where the controller 121 of the authentication device 12 determines that authentication has been performed.

The controller 121 of the authentication device 12 transmits a reply indicating that authentication has been performed to the controller 101 of the terminal device 10 in a case where two types of information of the application specific information and image forming device specific information are already registered in the database 126 as described above.

When the controller 101 receives the reply indicating that authentication has been performed, the controller transmits a target application to be installed to the image forming device 14 in which the installation is to be performed, in accordance with the installer to install the application, and sets up the application. The controller 141 of the image forming device 14 receives the target application from the terminal device 10, stores the target application in the HDD 144, and adds the application. At this time, the license authentication information is not transmitted and received through the network 16.

Figure 6:
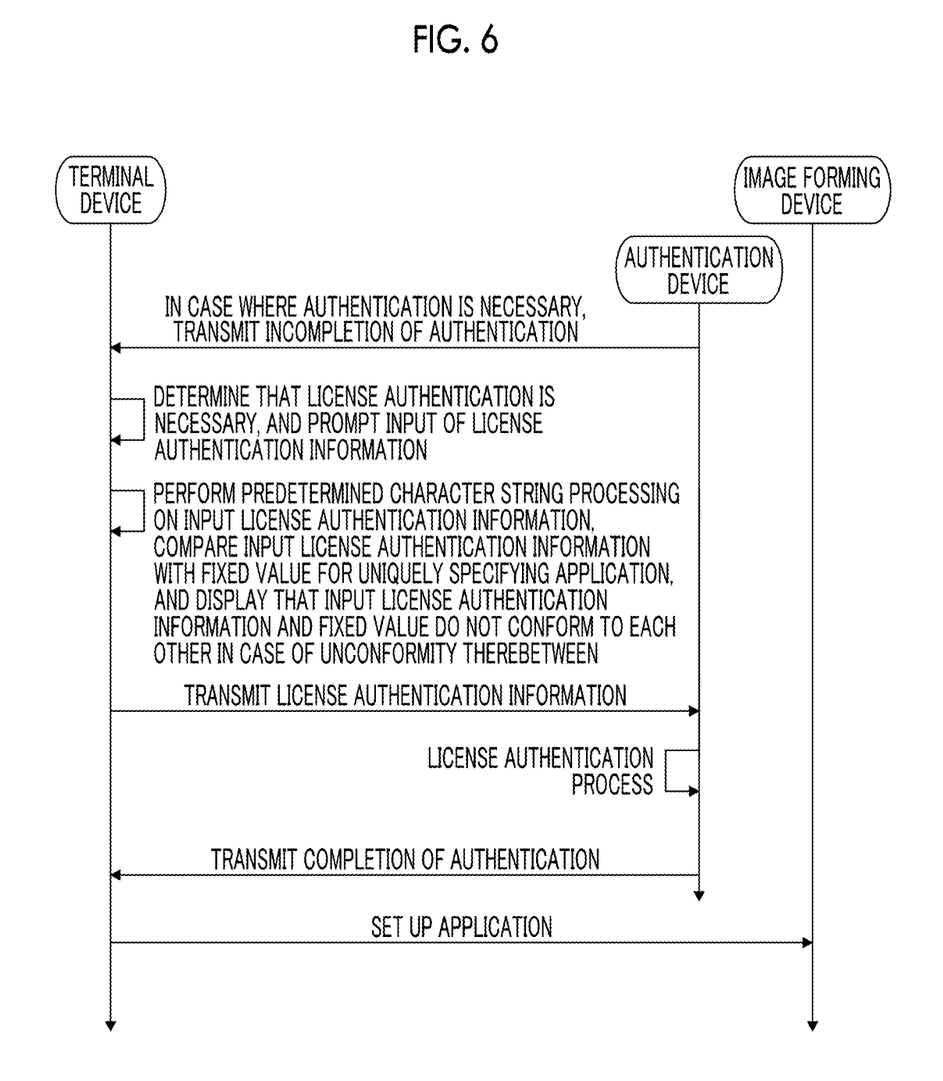
FIG. 6 is a sequence diagram (Part 4) of the exemplary embodiment.

FIG. 6 is another sequence diagram in a case where the controller 121 of the authentication device 12 determines that authentication has not been performed.

In a case where two types of information of the application specific information and the image forming device specific information are not registered in the database 126, the controller 121 of the authentication device 12 determines that authentication is necessary and transmits a reply indicating that authentication has not been performed to the controller 101 of the terminal device 10.

When the controller 101 receives the reply indicating that authentication has not been performed, the controller determines that license authentication is necessary and displays a screen for prompting the input of the license authentication information on the display unit. A user inputs license authentication information of a target application to be installed, for example, a license key in accordance with the screen.

The controller 101 performs predetermined character string processing on the input license authentication information, compares the input license authentication information with the application specific information, and determines whether or not both the pieces of information conform to each other. Predetermined license authentication information (license key) and the commodity code (product key) as application specific information have a fixed relationship, and the commodity code (product key) is obtained when performing predetermined character string processing on regular license authentication information. Therefore, when a processing value obtained by processing the input license authentication information and the application specific information are collated with each other and conform to each other, it is verified that the input license authentication information is the regular license authentication information.

In a case where it can be verified that the input license authentication information is regular license authentication information, the controller 101 transmits sequence authentication information which is input in the same manner as in the sequence diagram illustrated in FIG. 4 to the authentication device 12. The subsequent processing is the same as that in FIG. 4. That is, when the controller 121 of the authentication device 12 receives the license authentication information, the controller performs an authentication process in accordance with an authentication processing program. Specifically, the received license authentication information is collated with predetermined information, and it is determined whether or not both the pieces of information conform to each other. In a case of conformity, the controller 121 registers the application specific information, the image forming device specific information, and the input license authentication information in the database 126 as a set, and transmits a reply indicating that authentication has been performed to the controller 101.

When the controller 101 receives the reply indicating that authentication has been performed, the controller transmits a target application to be installed to the image forming device 14 in which the installation is to be performed, in accordance with the installer to install the application, and sets up the application. The controller 141 of the image forming device 14 receives the target application from the terminal device 10, stores the target application in the HDD 144, and adds the application. Meanwhile, when the controller 101 receives the reply indicating that authentication has been performed, the controller deletes the input license authentication information from the memory.

On the other hand, in a case where it cannot be verified that the input license authentication information is the regular license authentication information, the controller 101 determines that the input license authentication information is not appropriate, and displays the input license authentication information not being appropriate on the display unit to prompt the re-input of the license authentication information. In a case where the license authentication information is input again, the controller 101 similarly performs predetermined character string processing and collates the license authentication information with the application specific information to perform verification. In a case where the number of times of re-input reaches a fixed upper limit, the controller 101 stops the installation in the image forming device 14. According to this example, the validity of the license authentication information is checked by the processing within the terminal device 10, and unnecessary transmission and reception may be suppressed.

Meanwhile, in FIG. 3, when two types of application specific information and image forming device specific information are already registered in the database 126, the controller 121 of the authentication device 12 transmits a reply indicating that authentication has been performed to the controller 101 of the terminal device 10, but a set of (application specific information, image forming device specific information, and license authentication information) is registered in the database 126. Accordingly, when an expiration date is set in the license authentication information, it may be determined whether or not the license authentication information is within the expiration date, with reference to the expiration date. When the license authentication information is within the expiration date, a reply indicating that authentication has been performed is transmitted to the controller 101 of the terminal device 10. When the expiration date has expired, a reply indicating that authentication has not been performed is transmitted to the controller 101 of the terminal device 10 even when two types of values are already registered. In this case, two types of information and the license authentication information are registered in the database 126 again in accordance with the sequence of FIG. 4 or FIG. 6.

Figure 7:
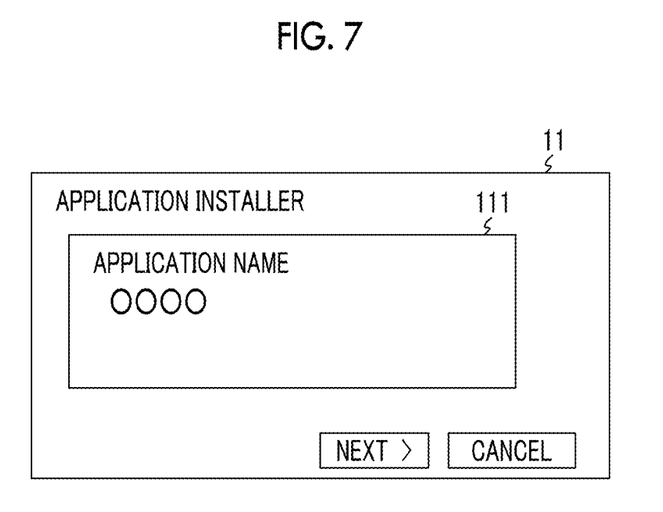
FIG. 7 is a diagram (Part 1) illustrating a screen of the exemplary embodiment.

FIG. 7 illustrates an example of a screen 11 displayed on the display unit of the terminal device 10. When a user operates the operation unit 105 of the terminal device 10 to start the installer, the controller 101 displays a screen for setting a target application to be installed on the display unit in accordance with the installer. Regarding the installer, the program name thereof is displayed at the upper portion of the screen as "application installer", and a screen 111 for specifying a target application to be installed is displayed. For example, the user selects an application to be installed from among the applications listed within the screen 111 by using a mouse or the like. When the application to be installed is selected and set, the controller 101 acquires application specific information of the selected application from a registry file or the like.

Figure 8:
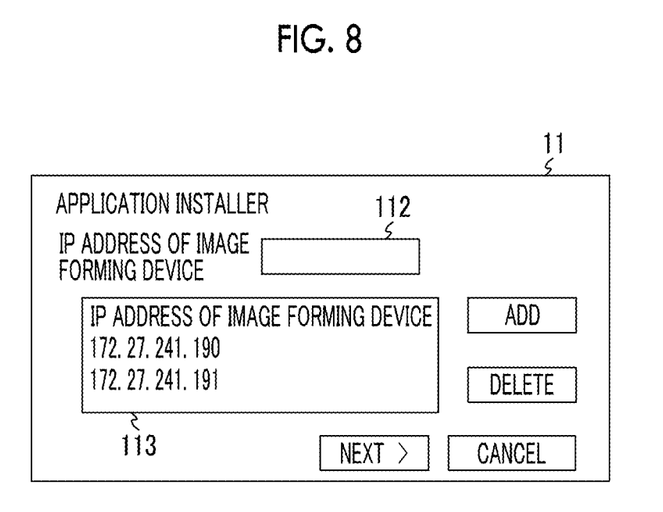
FIG. 8 is a diagram (Part 2) illustrating a screen of the exemplary embodiment.

FIG. 8 illustrates an example of a screen displayed after the target application to be installed is selected in FIG. 7. The controller 101 displays a screen for setting the image forming device 14 which is an installation destination on the display unit in accordance with the installer. A list screen 113 of IP addresses of image forming devices 14 which are already input is displayed together with an input field 112 for specifying the image forming device 14 by an IP address. This screen shows that two image forming devices 14 specified by two IP addresses of 172.27.241.190 and 172.27.241.191 are set as image forming devices 14 which are installation destinations. As shown in this example, the number of image forming devices 14 which are installation destinations is not required to be one, and target applications may be simultaneously installed on plural image forming devices 14. When the image forming device 14 which is an installation destination is set, the controller 101 automatically transmits a request for acquiring image forming device specific information to the set image forming device 14 as described above, and receives the image forming device specific information returned from the image forming device 14. Two types of information of application specific information and image forming device specific information are transmitted to the controller 121 of the authentication device 12.

Figure 9:
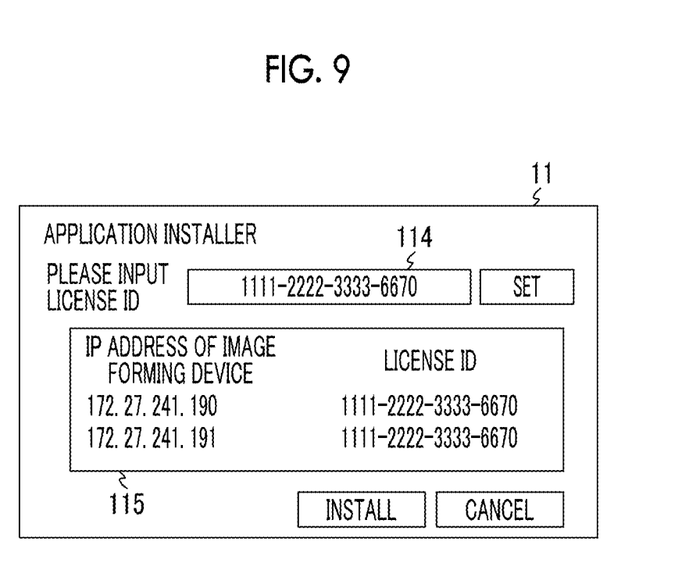
FIG. 9 is a diagram (Part 3) illustrating a screen of the exemplary embodiment.

FIG. 9 illustrates an example of a screen in a case where information indicating that authentication has not been performed is received from the controller 121 of the authentication device 12. The controller 101 displays the input field 114 of the license authentication information on the display unit in accordance with the installer. When a user inputs the license authentication information, the license authentication information associated with the image forming device 14 for which setting has been performed in the previous screen is displayed on the list screen 115. When the user inputs the license authentication information and operates an "install" button, the controller 101 transmits the license authentication information to the controller 121 of the authentication device 12. Meanwhile, in the sequence of FIG. 6, the license authentication information which is input in the controller 101 is verified, and is transmitted to the controller 121 of the authentication device 12 only when the license authentication information is verified. In a case where the license authentication information cannot be verified, a message such as "license authentication information has an error" is displayed on the screen 11. When the user inputs correct information in response to the message, the information is transmitted to the controller 121.

When the controller 121 of the authentication device 12 receives the license authentication information, the controller performs an authentication process, registers a set of (application specific information, image forming device specific information, and license authentication information) in the database 126, and transmits a reply indicating that authentication has been performed to the controller 101. When the controller 101 receives the reply indicating that authentication has been performed, the controller transmits a target application to be installed to the image forming device which is an installation destination to install the application. When the controller 141 of the image forming device 14 completes the installation of the transmitted target application, the controller transmits a completion notification to the controller 101 as a reply.

Figure 10:
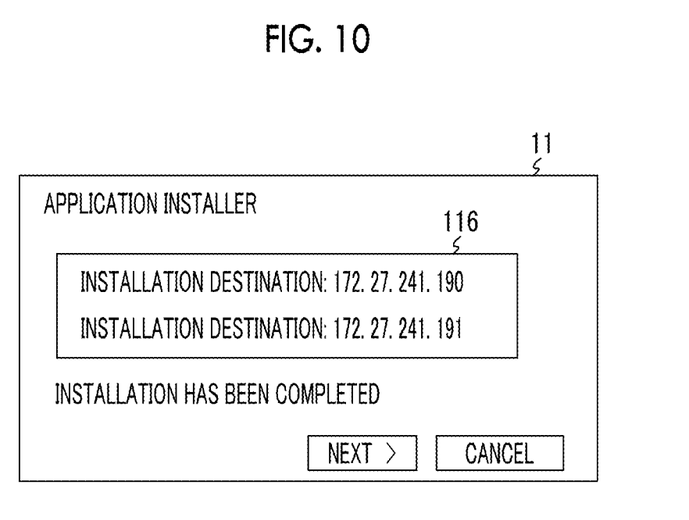
FIG. 10 is a diagram (Part 4) illustrating a screen of the exemplary embodiment.

FIG. 10 illustrates an example of a screen in a case where installation has been completed. When the controller 101 receives the completion notification from the controller 141 of the image forming device 14, the controller displays a list screen 116 of information (IP address in the drawing) for specifying the image forming device 14 which is an installation destination and also displays information indicating that the installation has been completed. Naturally, information for specifying a target application installed in the example of the screen may be displayed. A user can know that the application has been installed and set up in the image forming device 14 by visually recognizing the screen.

In this manner, in this exemplary embodiment, application specific information and image forming device specific information are transmitted to the authentication device 12, and the installation of an application is performed when authentication has already been performed. Accordingly, it is possible to complete the installation without transmitting the license authentication information through the network 16. In addition, it is possible to complete the installation only by transmitting the license authentication information to the authentication device 12 from the terminal device 10 only once in a case where authentication has not been performed. Further, in this exemplary embodiment, the license authentication information is unitarily managed in the authentication device 12, and is not stored in a cache memory of the terminal device 10 or the image forming device 14. In this exemplary embodiment, the application specific information and the image forming device specific information transmitted to the authentication device 12 do not have confidentiality, and are not misused even when an illegal user taps these pieces of information. That is, the illegal user having performed tapping has no mechanism such as a UI for inputting these pieces of information, and thus cannot misuse the information.

In this exemplary embodiment, attention has to be paid to the fact that it can be confirmed whether or not authentication has been performed in the authentication device 12 only by transmitting and receiving two types of information having no confidentiality such as application specific information and image forming device specific information without inputting license authentication information again, referring to a cache of the license authentication information, and transmitting and receiving the license authentication. It can be said that this exemplary embodiment satisfies the following two conditions:

(1) the license authentication information is not stored for a long period of time in a device other than the authentication device 12; and (2) only information having no confidentiality is used to confirm whether or not authentication has been performed, and the license authentication information with high confidentiality is input, transmitted, and received only once as a rule. Thereby, it is possible to prevent the license authentication information from being illegally acquired due to an ill-intentioned dumping act for a node other than the authentication device 12 and to effectively suppress tapping.

As described above, the exemplary embodiment of the present invention has been described. However, the present invention is not limited thereto, and various modification examples can be made. Hereinafter, these modification examples will be described.

Modification Example 1

In the exemplary embodiment, the terminal device 10, the authentication device 12, and the image forming device 14 are configured to be connected to the network 16 as illustrated in FIG. 1. However, the image forming device 14 may have a function of the terminal device 10, and the authentication device 12 and the image forming device 14 may be configured to be connected to the network 16.

Figure 11:
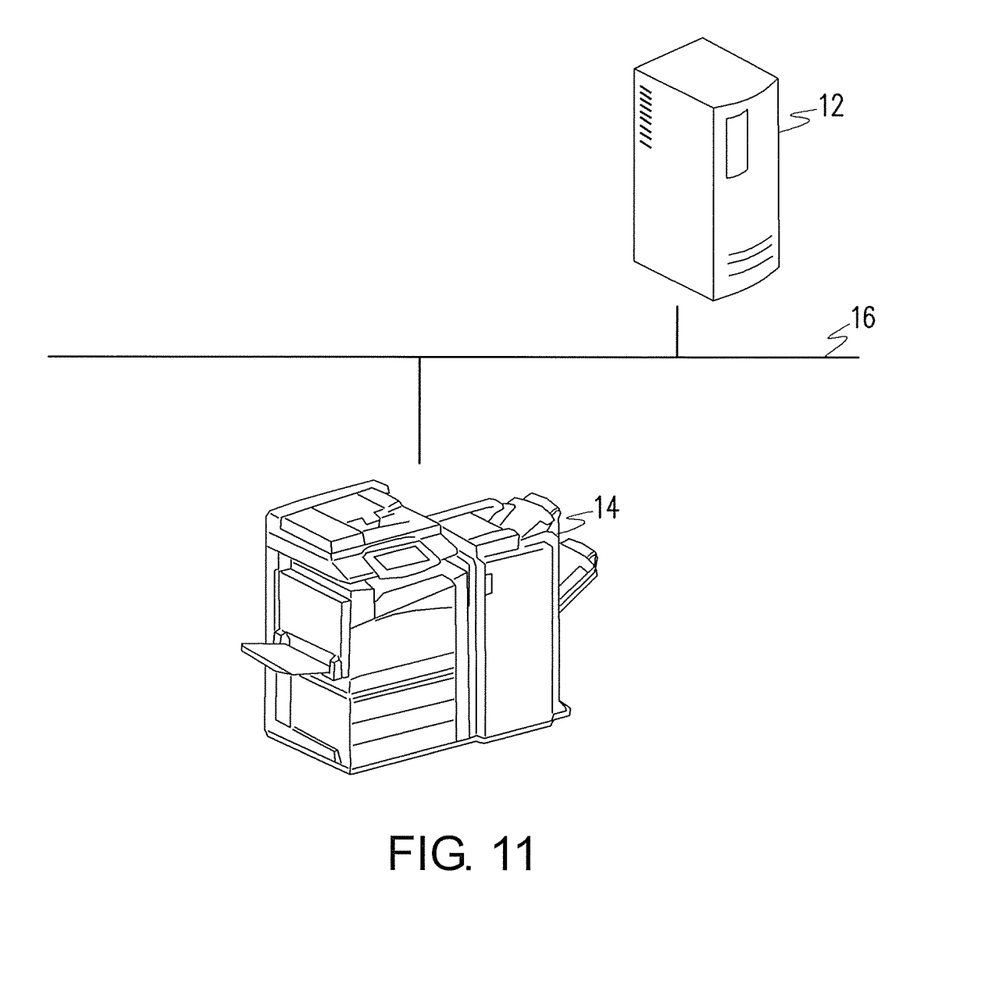
FIG. 11 is a system configuration diagram of another exemplary embodiment.

FIG. 11 illustrates a system configuration in this case. The image forming device 14 has a function of the terminal device 10, and an installer is stored in a program memory such as a ROM or an HDD. The controller 141 of the image forming device 14 starts the installer on the basis of a user's operation instruction, acquires application specific information and image forming device specific information, and transmits the acquired application specific information and image forming device specific information to the authentication device 12. The controller 121 of the authentication device 12 determines whether or not the two types of information has already been registered with reference to the database 126, and transmits a reply indicating that authentication has been performed or has not been performed to the image forming device 14. The controller 141 of the image forming device 14 immediately performs the installation of an application when authentication has been performed. When authentication has not been performed, a user is prompted to input license authentication information, and the input license authentication information is transmitted to the authentication device 12. In a case where authentication is performed by the authentication device 12, the controller 141 performs the installation of an application. In addition, the controller 141 deletes the input license authentication information from the memory.

Even in this modification example, it is possible to confirm whether or not authentication has been performed only by transmitting two types of information having no confidentiality without inputting, transmitting, and receiving license authentication information and to perform the installation of an application when authentication has been performed. Even when authentication has not been performed, the input, transmission, and reception of license authentication information may be performed only once.

Modification Example 2

In the exemplary embodiment, a case where an application is installed on plural image forming devices 14 has been described (see FIGS. 8, 9, and 10). In a case where ten image forming devices 14 are set to transmit application specific information and image forming device specific information to the authentication device 12 and only seven image forming devices among the ten image forming devices have completed authentication, the authentication device 12 transmits a reply indicating that authentication has been performed only to sets of an application and the image forming devices 14 having been subjected to authentication, and transmits a reply indicating that authentication has not been performed to the other image forming devices. In this case, the controller 101 of the terminal device 10 prompts the input of license authentication information for the sets of an application and the image forming devices 14 not having been subjected to authentication, and a user collectively inputs the license authentication information for the plural sets not having been subjected to authentication (see FIG. 8). Thereby, it is possible to suppress the number of times of input of the license authentication information to once.

Modification Example 3

In the exemplary embodiment, the input field 112 for inputting an IP address of the image forming device 14 in which installation is to be performed is displayed as illustrated in FIG. 8, but an input field for inputting a user name and a password of a manager (administrator or the like) of the image forming device 14 may be additionally displayed.

Modification Example 4

In the exemplary embodiment, the controller 101 of the terminal device 10 acquires application specific information and image forming device specific information in accordance with an installer and transmits the acquired pieces of information to the authentication device 12. However, this is automatically performed in association with the start-up of the installer, and a user is not aware that these pieces of information are transmitted to the authentication device 12. In a case where it is determined that authentication has already been performed in the authentication device 12, the installation of an application is automatically performed, and thus the user is not conscious that authentication has been performed in the authentication device 12. However, the application specific information and the image forming device specific information may be transmitted to the authentication device 12 in response to the user's operation instruction. Alternatively, the fact that authentication has been performed in the authentication device 12 may be displayed on the display unit of the terminal device 10 in a case where authentication has been performed, and the execution of installation of an application may be started in response to the user's operation instruction.

Modification Example 5

In the exemplary embodiment, a model code and a machine serial key have been described as image forming device specific information. In addition to this, a character string having a model code and a machine serial key being connected to each other or a media access control (MAC) address may also be used.

Modification Example 6

In the exemplary embodiment, when the authentication device 12 receives application specific information and image forming device specific information, it is determined whether or not authentication has been performed by using the two types of values. However, the two types of values are not registered in the database 126 at this point in time. When license authentication information is received due to authentication not having been performed and authentication is normally performed, a set of (application specific information, image forming device specific information, and license authentication information) is registered in the database 126. However, as the application specific information and the image forming device specific information at this time, application specific information and image forming device specific information which are received and temporarily stored in the memory are used. However, the terminal device 10 transmits these two types of values to the authentication device 12 again when transmitting license recognition information, and the authentication device 12 may register the two types of values to be transmitted later again in the database 126.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An authentication device comprising:
   a hardware processor, configured to:
   receive specific information of an application to be installed and specific information of an image forming device which is an installation destination from a terminal device or from the image forming device;
   collate the specific information of the application and the specific information of the image forming device with a database to output an authentication result indicating that authentication has been performed or has not been performed;
   in response to any one of the specific information of the application and the specific information of the image forming device being absent in the database, transmit the authentication result indicating that authentication is required to install and setup the application on the image forming device to the terminal device, wherein the terminal device prompts a user to input license authentication information of the application after receiving the authentication result indicating that authentication is required from the authentication device,
   receive the license authentication information of the application from the terminal device,
   perform authentication by using the license authentication information,
   associate the specific information of the application, the specific information of the image forming device, and the license authentication information with each other,
   register the associated specific information of the image forming device, and the associated license authentication information in the database as a completion of the authentication,
   in response to the completion of the authentication, transmit the authentication result indicating that authentication has been performed to the terminal device, wherein the terminal device deletes the license authentication information after receiving the authentication result that authentication has been performed, and
   allow the terminal device to transmit the application to the image forming device for installation and setup of the application; and
   in response that the specific information of the application and the specification information of the image forming device have both been registered in the database,
   transmit the authentication result indicating that authentication has been performed to the terminal device, and
   allow the terminal device to transmit the application to the image forming device for installation and setup.

2. The authentication device according to claim 1, wherein the specific information of the application to be installed is a unique commodity code or a unique product key of the application,
   wherein the specific information of the image forming device is a model code or a machine serial key of the image forming device, and
   wherein the license authentication information is a license key of the application and has a fixed relationship with the specific information of the application.

3. The authentication device according to claim 1, wherein the hardware processor receives specific information of another image forming device as another installation destination along with the specific information of the image forming device from the terminal device,
   wherein the hardware processor performs the license authentication information with respect to the image forming device and the another image forming device at the same time, and
   wherein the hardware processor allows the terminal device to transmit the application to the image forming device and the another image forming device for installation and setup of the application in response to the authentication result indicating that authentication has been performed to the terminal device.

4. The authentication device according to claim 3,
wherein the image forming device and the another image forming device are selected at the same time by the terminal device.

5. A terminal device comprising:
a transmitter that transmits specific information of an application to be installed and specific information of an image forming device which is an installation destination to an authentication device; and
a hardware processor, configured to:
  in response to any one of the specific information of the application and the specific information of the image forming device being absent in a database and in response that an authentication result indicating that authentication is required to install and setup the application on the image forming device is received from the authentication device,
    prompt a user to input license authentication information of the application,
    transmit the license authentication information of the application from the transmitter to the authentication device,
    receive an authentication result indicating that authentication has been performed from the authentication device after the authentication has been performed and completed, and delete the authentication information after receiving the authentication result indicating that authentication has been performed from the authentication device, and
    transmit the application to the image forming device through the transmitter for installation and setup; and
  in response that an authentication result authentication result indicating that authentication has been performed from the authentication device,
    transmit the application to the image forming device through the transmitter for installation and setup.

6. An image forming system comprising:
an image forming device that transmits specific information of an application to be installed and specific information of an image forming device which is an installation destination; and
an authentication device that comprises a hardware processor configured to:
  receive the specific information of the application and the specific information of the image forming device;
  collate the received information with a database to output an authentication result indicating that authentication has been performed or has not been performed to the image forming device;
  in response to any one of the specific information of the application and the specific information of the image forming device being absent in the database,
    transmit the authentication result indicating that authentication is required to install and setup the application on the image forming device to the terminal device, wherein the terminal device prompts a user to input license authentication information of the application after receiving the authentication result indicating that authentication is required from the authentication device,
    receive the license authentication information of the application from the terminal device,
    perform authentication by using the license authentication information,
    associate the specific information of the application, the specific information of the image forming device, and the license authentication information with each other,
    register the associated specific information of the image forming device, and the associated license authentication information in the database as a completion of the authentication,
    in response to the completion of the authentication, transmit the authentication result indicating that authentication has been performed to the terminal device, wherein the terminal device deletes the license authentication information after receiving the authentication result that authentication has been performed, and
    allow the terminal device to transmit the application to the image forming device for installation and setup of the application; and
  in response that the specific information of the application and the specification information of the image forming device have both been registered in the database,
    transmit the authentication result indicating that authentication has been performed to the terminal device, and
    allow the terminal device to transmit the application to the image forming device for installation and setup the application on the image forming device.

7. The image forming system according to claim 6,
wherein the terminal device or the image forming device verifies the license authentication information, and transmits the verified license authentication information to the authentication device.

8. A non-transitory computer readable medium storing a program causing a computer to execute:
  transmitting specific information of an application to be installed and specific information of an image forming device which is an installation destination;
  in response to any one of the specific information of the application and the specific information of the image forming device being absent in a database and in response that an authentication result indicating that authentication is required to install and setup the application on the image forming device is received from the authentication device,
    prompting a user to input license authentication information of the application,
    transmitting the license authentication information of the application from the transmitter to the authentication device,
    receiving an authentication result indicating that authentication has been performed from the authentication device after the authentication has been performed and completed, and delete the authentication information after receiving the authentication result from the authentication device, and
    transmitting the application to the image forming device through the transmitter for installation and setup the application on the image forming device; and
  in response that an authentication result authentication result indicating that authentication has been performed from the authentication device,
    transmit the application to the image forming device for installation and setup the application on the image forming device.

* * * * *